Dec. 8, 1964 W. H. McLELLAN 3,160,844
HIGH OUTPUT ELECTRICAL STRAIN TRANSDUCERS
Filed March 22, 1962 2 Sheets-Sheet 2
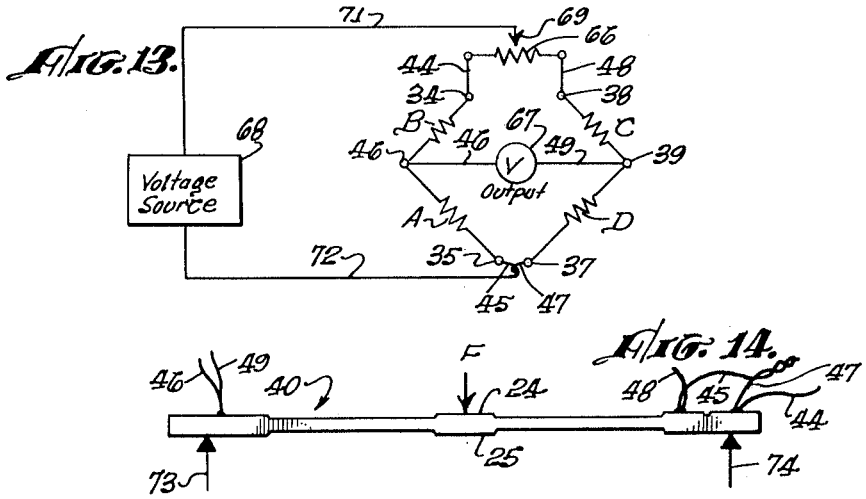
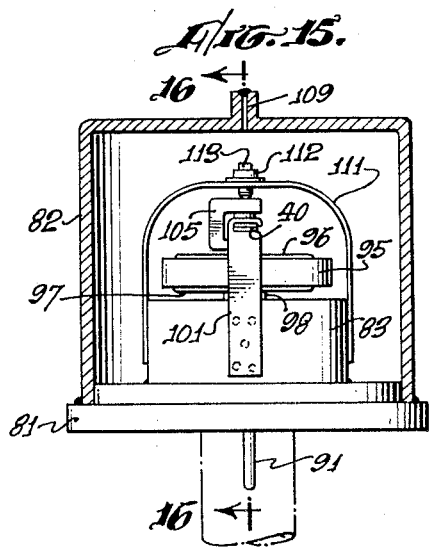
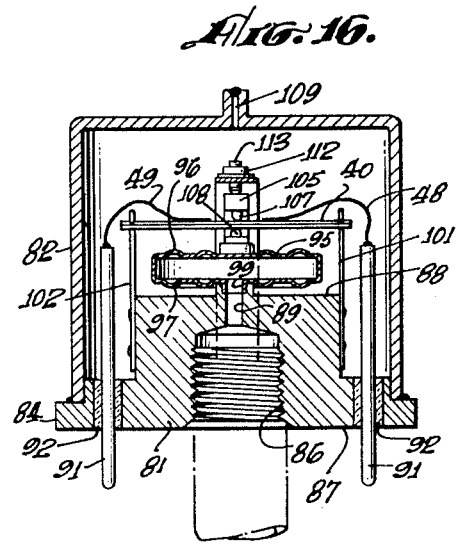
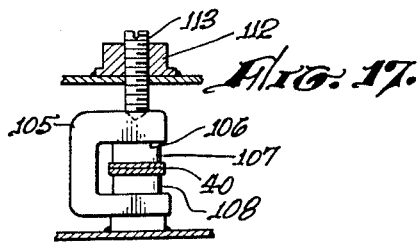
WILLIAM H. McLELLAN,
INVENTOR.
BY HIS ATTORNEYS.
Spensley & Horn

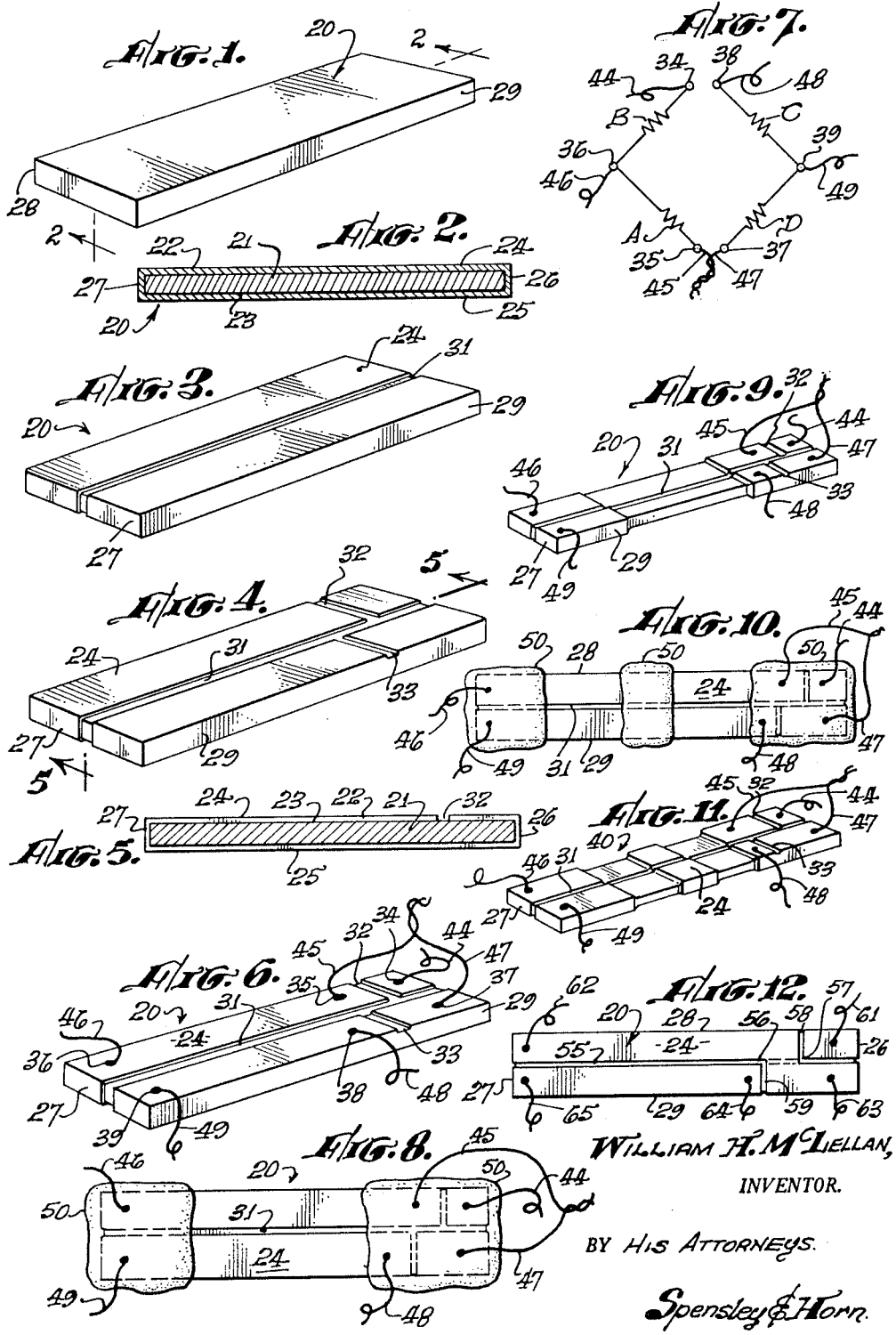

United States Patent Office 3,160,844
Patented Dec. 8, 1964

3,160,844
HIGH OUTPUT ELECTRICAL STRAIN
TRANSDUCERS
William H. McLellan, Pasadena, Calif., assignor to Electro-Optical Systems, Inc., Pasadena, Calif., a corporation of California
Filed Mar. 22, 1962, Ser. No. 181,644
21 Claims. (Cl. 338—4)

This invention relates in general to strain-electrical translating elements and more particularly to high output strain gauges employing a semiconductor element.

Transducers in which a force summing means varies the tensile stress on a piezoresistive sensor are well known in the art. In these transducers a variation in tensile stress causes a variation in the electrical resistance of the sensor which is thus a measure of the force imposed. The force summing means may be a rod, diaphragm, weight, or any other member subject to motion in space as a result of forces imposed thereon. The force summing means is the medium for summing of applied forces and transmitting the summed forces to the piezoresistive sensor or strain gauge. Through the use of an appropriate force summing means, the transducer may be used to measure such phenomena as displacement, pressure, velocity and acceleration. Hence, this invention further relates to and may be employed in the aforementioned various types of transducers.

Strain gauges are employed in two basic configurations: bonded and unbonded. The device of the present invention is applicable to both.

A thin rod or bar of any material exhibiting a sufficient piezoresistance effect can be used in a manner similar to that of the well-known prior art wire strain gauges. Young's modulus, E, relates the change in stress to the strain by the equation $$E = \frac{S}{\epsilon}$$

wherein S represents stress and $\epsilon$ represents strain. In a crystalline material such as silicon, E varies with direction. $\epsilon$ in the above equation, is the longitudinal strain resulting from simple longitudinal stress S assuming no stress in the transverse direction. The fractional change in resistivity due to a stress S is $$\frac{\Delta \rho}{\rho} = \pi S$$

where $\pi$ is the longitudinal piezoresistance coefficient and where $\rho$ represents the resistivity of the material. Thus, $$\frac{\Delta \rho}{\rho} = \pi \epsilon E$$

This can be written as $M\epsilon$, where M is defined as $\pi E$.
Since R of any material $$= \frac{\rho L}{A}$$

where R is the resistance of a rod, $\rho$, the resistivity, L its length and A its cross-sectional area, it can be shown, for a simple case that $$\frac{\Delta R}{R} = (1 + 2\delta + M)\epsilon$$

$\delta$ denotes Poisson's ratio; i.e., the ratio of the magnitude of transverse strain to longitudinal strain resulting from the postulated simple stress S. In the above equation, the first term on the right expresses the resistance change due to change in length; the second term is due to the change in area, and the third term is due to the resistivity change. The factor $$K = \frac{\Delta R}{R \epsilon} = 1 + 2\delta + M$$

is called the gauge factor. Most of the commonly used wire strain gauges have a gauge factor of between 2 and 4.

It is known that semiconductor materials exhibit a pronounced piezoresistive effect and semiconductor crystals of certain crystallographic orientation provide extremely sensitive sensors. For example, P type silicon has a gauge factor along the [111] direction of over 150, thus indicating an increase in sensitivity of up to 75:1 over ordinary materials. N type silicon has a similar gauge factor along the [100] direction.

In the semiconductor art, a region of semiconductor material containing an excess of donor impurities and having an excess of free electrons is considered to be an N type region, while a P type region is one containing an excess of acceptor impurities resulting in a deficiency of electrons, or stated differently, an excess of holes. A region heavily doped with an N type conductivity active impurity is designated as an N+ region, the + indicating that the concentration of the active impurity in the region is somewhat greater than the minimum required to determine the conductivity type. Similarly, a P+ region indicates a more heavily than normal dope region of P type conductivity. In an intrinsic region (I region), the holes and the electrons are in balance and hence the region cannot be said to be of either N type or P type conductivity.

When a continuous solid specimen of crystal semiconductor material has an N type region adjacent to a P type region, the boundary between them is termed a PN (or NP) junction. The term "junction" as used herein is intended to include the boundary between an N region and an N+ region, and that between a P region and a P+ region as well as any other combination of P, N, I, P+ and N+ which results in an electrical conductivity barrier between any two such adjoining regions.

The term "semiconductor material" as utilized herein is considered generic to germanium, silicon, and germanium-silicon alloys, silicon carbide and compounds such as indium-antimonide, gallium-antimonide, aluminum-antimonide, indium-arsenide, gallium-phosphorus alloys, and indium-phosphorus alloys and the like.

The term "active impurity" is used herein to denote those impurities which affect the electrical rectification characteristics of semiconductor materials as distinguished from other impurities which have no appreciable effect upon these characteristics. Active impurities are ordinarily classified as donor impurities such as phosphorus, arsenic and antimony, or acceptor impurities such as boron, aluminum, gallium and indium.

Prior art metallic strain gauges, which are typically of wire, have a relatively low gauge factor, as indicated above. Further, the output signal produced by such gauges and the signal-to-noise ratio are both relatively low. Additionally, such prior art strain gauges are characterized by inaccuracy from hysteresis due to plastic and metallic flow. The mechanical stability of such wire gauge elements is relatively poor and their resistivity low.

While the use of semiconductor material as strain gauge elements has been known to the prior art, such strain gauges are not without their disadvantages. Prior art semiconductor strain gauge elements of the bonded type suffer from hysteresis and inefficient coupling to the system, while prior art unbonded semiconductor strain gauge elements are difficult to fabricate and couple to the system. Additionally, although prior art semiconductor strain gauge elements produce greater voltage outputs than the wire strain gauge elements when connected in the usual Wheatstone bridge circuit, an even greater output is desirable.

Accordingly, it is an object of the present invention to provide improved semiconductor strain gauges.

It is also an object of the present invention to provide improved transducer structures utilizing semiconductor crystals as the piezoresistive sensors.

It is another object of the present invention to provide high output semiconductor strain gauges.

It is yet another object of the present invention to provide semiconductor strain gauges which are free from hysteresis.

It is a further object of the present invention to provide an improved integrated semiconductor strain gauge element.

It is a still further object of the present invention to provide a device of the character described which lends itself to ease of fabrication.

It is also an object of the present invention to provide methods for producing the devices of the character described.

It is another object of the present invention to provide extremely sensitive and compact transducer structures.

It is still another object of the present invention to provide a method for accurately adjusting the resistivity of semiconductor strain gauges.

The objects of the present invention are accomplished by utilizing a piezoresistive sensor consisting of an elongate unitary body of semiconductor material fashioned from a single semiconductor crystal. The upper and lower surfaces of the elongate crystal are of a different conductivity type from that of the main portion of the crystal body and electrically isolated therefrom by the high impedance barrier formed by the rectifying junctions. In the illustrated embodiments, a predetermined pattern of grooves which penetrate the rectifying junctions are provided in the surfaces of the crystal to form discrete electrically isolated active gauge elements, the active gauge elements being electrically interconnected so that each gauge element is suitable for use in a different leg of a Wheatstone bridge circuit. In an illustrative embodiment, the elongate crystal is utilized as a freely supported beam which is point loaded by the force-summing element of the transducer.

The novel features which are believed to be characteristic of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is intended as a definition of the limits of the invention.

In the drawing:

FIGURE 1 is a perspective view of an elongate single crystal of semiconductor material;

FIGURE 2 is a cross-sectional view, in elevation, of the crystal of FIGURE 1 in an early stage of production upon completion of a diffusion operation;

FIGURE 3 is a perspective view of the crystal of FIGURE 1 at a subsequent stage of production;

FIGURE 4 is a perspective view of the crystal of FIGURE 1 at a later stage of production;

FIGURE 5 is a view taken along the line 5—5 of FIGURE 4;

FIGURE 6 is a perspective view of the crystal of FIGURE 1 in a later stage of production upon provision of electrical leads thereto;

FIGURE 7 is an electrical schematic diagram of the embodiment shown in FIGURE 6;

FIGURE 8 is a plan view of the embodiment of FIGURE 6 showing the ends of the crystal masked in preparation for an etching operation;

FIGURE 9 is a perspective view of the completed piezoresistive sensor;

FIGURE 10 is a plan view of the embodiment of FIGURE 6 showing an alternative masking configuration;

FIGURE 11 is a perspective view showing an alternative embodiment of a piezoresistive sensor resulting from the masking configuration shown in FIGURE 10;

FIGURE 12 shows another alternative embodiment of a piezoresistive sensor utilizing only five electrical leads;

FIGURE 13 is a schematic diagram showing electrical interconnection of the present invention piezoresistive sensor in a bridge circuit;

FIGURE 14 is an elevational view depicting the support and loading of the piezoresistive sensor;

FIGURE 15 is an elevational view in cross section of a pressure transducer utilizing the piezoresistive sensor of the present invention;

FIGURE 16 is a view taken along the line 16—16 of FIGURE 15; and,

FIGURE 17 is an enlarged partial view showing how the crystal beam is loaded.

In co-pending patent application Serial No. 29,837, entitled "Electrical Strain Transducer," by William V. Wright, Jr., filed May 18, 1960, now U.S. Patent 3,049,685, issued on August 14, 1962, there is disclosed the concept of utilizing a piezoresistive sensor formed from a semiconductor crystal having zones of different conductivity types therein, the high impedance barrier formed by the rectifying junction between zones of different conductivity serving to electrically isolate the different zones without structurally or thermally isolating them. As an example of this concept, atoms of a P type active impurity are diffused into the upper and lower longitudinal surfaces of an elongate unitary crystal of N type silicon to thereby create shallow P type surface regions. These elongate P type surface regions are provided with electrical contacts at each end thereof for measurement of changes in the resistance of the P type region between the contacts in response to physical stresses applied to the crystal. If the crystal is subjected to longitudinal bending, one of the P type surface regions will be subjected to a compressive stress while the P type surface region on the opposing surface will be subjected to a tensile stress. Hence, the opposing surface regions are connected in opposite legs of a Wheatstone bridge circuit. The present invention is an extension of the aforementioned concept to provide a unitary semiconductor crystal beam with four active gauge elements, two of the active gauge elements being on the upper longitudinal surface of the crystal beam and the other two active gauge elements being on the lower longitudinal surface of the crystal beam. Thus, each of the active gauge elements forms a different one of the four legs of the Wheatstone bridge, thereby providing an increased output. In addition, although the active gauge elements are disposed on opposing surfaces of the crystal beam, the novel structure of the present invention provides electrical connection to all of the gauge elements on one longitudinal surface of the crystal beam.

Referring now to the drawings, and more particularly to FIGURES 1 through 9 thereof, there is shown the progressive steps in the fabrication of an illustrative embodiment of the present invention piezoresistive sensor from a single unitary crystal body. A single unitary crystal body of semiconductor material can be produced by methods and means well known to the art, such as by growing a single crystal by withdrawing a small seed crystal from a melt of silicon. In this exemplary embodiment, the silicon body is of N type conductivity produced, for example, by including a doping agent such as arsenic in the molten silicon from which the seed crystal is drawn. After the large single N type conductivity crystal is thus produced, it is sliced into wafers, which wafers are then lapped to a thickness of about 0.014 inch and cut to a width which will be the final crystal beam length, each wafer having its width dimension extending along the [111] crystallographic direction. Although an N type silicon wafer is utilized in the illustrative embodiment, a P type wafer could also be utilized with the width dimension of the wafer extending along the [100] crystallographic direction.

The wafers are then etched to a thickness of about 0.010 inch to remove surface damage caused by the cutting operations. An etch which is typically used is a 1:1:1 combination of hydrofluoric, hydrochloric and acetic acids. The wafers are then placed into a diffusion furnace containing a P type dopant such as boron, for example, and heated to vapor diffuse boron into the surfaces of the wafers to a depth of at least 0.00025 inch, which is the minimum depth required for a subsequent metallizing operation. The wafer is then sawed along its width dimension to provide a plurality of elongate crystal bodies approximately 0.05 inch wide and 0.5 inch in length, the extreme end portions of the starting wafer being discarded. Thus, there results a plurality of elongate crystal bodies of N type silicon having a peripheral surface band of P type conductivity. One of these crystal bodies is shown in FIGURES 1 and 2 and indicated generally by the reference numeral 20. FIGURE 1 is a perspective view while FIGURE 2 is a cross-sectional view taken along the line 2—2 of FIGURE 1, FIGURE 2 clearly showing the underlying N type silicon portion 21 and the P type peripheral surface band 22, the P type band 22 being electrically isolated from the N type portion 21 by a PN junction 23. It should be noted that the N type portion 21 and the P type surface band 22 are an integral part of the crystal 20 and no physical or structural change or discontinuity is present in the crystal. The PN junction 23 is an electrical conductivity barrier only while the crystal 20 remains a solid continuous specimen of semiconductor material. Thus, the crystal 20 remains a unitary body with no physical distinctions or discontinuities present therein, while the N type portion 21 and the P type band 22 are electrically isolated, one from the other. Unlike prior art piezoresistive sensors utilizing a PN junction, the diffused surface region extends continuously peripherally around the crystal. That is, the P type band 22 completely covers the upper longitudinal surface 24 of the crystal 20, the lower longitudinal surface 25, and the end surfaces 26 and 27, and is exclusive of its longitudinal side surfaces 28 and 29.

The crystal 20 is then scribed and etched, in accordance with any one of the various well known techniques, to provide a continuous longitudinally circumferential groove 31 extending through the P type band 22 and penetrating the PN junction 23, the crystal 20 then appearing as shown in FIGURE 3. That is, the groove 31 defines a continuous peripheral band extending across the upper longitudinal surface 24 around the end surface 26, along the lower longitudinal surface 25 and around the end surface 27 of the crystal 20.

Next, two transverse grooves, indicated by the reference numerals 32 and 33 are scribed and etched in the upper surface 24 near the end 26 of the crystal 20, the grooves 32 and 33 extending through the P type band 22 and penetrating the PN junction 23. The groove 32 extends between the longitudinal groove 31 and the side surface 28, while the groove 33 extends from the longitudinal groove 31 to the side surface 29 of the crystal 20. The grooves 32 and 33 are preferably offset, as shown, to minimize the stress concentration caused by the grooves. The crystal 20 will then appear as shown in FIGURES 4 and 5.

The next step is to attach suitable electric contacts and leads to the crystal. This may be accomplished by any well known prior art technique such as metal plating followed by soldering or alloying. Alternatively, suitable metallic contacts could be formed by an evaporation technique coordinated with the etching step so that the junction is not electrically short circuited. In the illustrated embodiment (see FIGURE 6), six gold contacts are alloyed to the upper longitudinal surface 24 of the crystal 20, the alloy contacts being identified by the reference numerals 34–39. The gold contact 34 is ohmically bonded to the surface 24 at the end 26 and adjacent the groove 32. The gold contact 35 is ohmically bonded to the surface 24 adjacent the groove 32 on the opposite side of the groove 32 from the gold contact 34. The gold contact 36 is ohmically bonded to the surface 24 near the end 27 between the groove 31 and the side surface 28. The gold contact 37 is ohmically bonded to the surface 24 between the groove 33 and the end surface 26. The gold contact 38 is ohmically bonded to the surface 24 on the opposite side of the groove 33 from the gold contact 37. The gold contact 39 is ohmically bonded to the surface 24 near the end 27 between the groove 31 and the side surface 29. To facilitate electrical connection to the gold contacts, filamentary gold wires are ohmically bonded thereto. Thus, as shown in FIGURE 6, the gold contacts 34–39 are provided respectively with electrical leads 44–49, the electrical leads 45 and 47 being interconnected.

In FIGURE 7, there is shown an electrical schematic diagram corresponding to the configuration of the crystal 20 as shown in FIGURE 6. That portion of the P type peripheral surface band 22 extending across the upper longitudinal surface 24 between the electrical contacts 35 and 36, and bounded on one side by the side surface 28 and on the other side by the wall surface of the groove 31 and on the underside by the high impedance barrier of the PN junction 23, defines an active gauge element indicated in FIGURE 7 as a resistance A, this resistance being measurable by connection of an ohmmeter between the electrical leads 45 and 56. Similarly, that portion of the peripheral surface band laterally bounded on one side by the side surface 28 and on the other side by the wall surface of the groove 31 and on the inner side by the high impedance barrier of the PN junction 23, and extending from the gold contact 36 around the end surface 27 and across the lower surface 25, around the end surface 26 and over the extreme end portion of the upper surface 24 to the gold contact 34, defines another active gauge element indicated in FIGURE 7 as a resistance B. The major portion of this second active gauge element is along the lower surface 25 of the crystal beam 20 while the active gauge element defining the resistance A is on the upper surface of the crystal beam 20. The resistances A and B are both physically and electrically connected in series since they are formed by a continuous portion of the P type surface band 22 extending longitudinally peripherally around the surface of the crystal 20 and interrupted only by the transverse groove 32. An advantage of this structural configuration becomes immediately apparent for all of the electrical contacts are on the upper surface 24 of the crystal 20 while one of the active gauges is in the upper surface 24 and the other active gauge is effectively on the lower surface 25.

Two more active gauges are defined on the crystal 20 by that portion of the P type surface band 22 bounded on one side by the side surface 29 and on the other side by a wall surface of the groove 31 and extending longitudinally peripherally around the surface of the crystal 20, interrupted only by the transverse groove 33. Thus, a third active gauge, indicated in FIGURE 7 as a resistance C, is provided between the gold contacts 38 and 39. A fourth active gauge element, indicated as a resistance D in FIGURE 7, is provided between the gold contacts 39 and 37, the fourth active gauge element extending around the end surface 27 and across the lower surface 25, around the end surface 26 and the immediate end portion of the upper surface 24 to the electrical contact 37. The physical location of these active gauges on the crystal 20 is correct to make a four-active arm bridge since the active gauges in the upper surface 24 are in one pair of opposite legs of the bridge, and the active gauges in the lower surface 25 are in the other pair of opposite legs of the bridge.

For the indicated size of the crystal 20, as shown in FIGURE 6, the resistances A, B, C and D are on the order of 100 ohms with a 0.00025 inch thickness for the P type surface band 22. A large range of resistance values can be obtained by control of the diffusion process which converts the original N type silicon material of the crystal 20 into the P type material at the surface and/or by chemically removing a small uniform layer of the P type surface after the contacts have been attached. The latter method permits the resistance to be monitored as the etching proceeds so that extremely fine control is possible. Naturally, the length and width of the gauge have a bearing on the resistance as well as do the thickness and electrical resistivity. It is possible to obtain gauge resistances on the order of 5,000 ohms without difficulty in the present invention structure by the use of an etching technique. The usual prior art unipolar gauge is not readily available in the most desirable resistivity materials with resistances above 1,000 ohms in short lengths because the gauge is too small and thin to handle safely. However, a higher resistance gauge is desirable since for a given heat dissipation (wattage rating), the square of the maximum permissible voltage is proportional to the resistance, thereby enabling application of a higher voltage to higher resistance gauges. For a given resistance ratio change in operation, a higher output will be obtained from the gauge operated from the higher potential. Furthermore, a high output provides the additional advantage of better signal-to-noise ratio and possible elimination of intermediate amplifiers, which leads to greater system reliability. Hence, portions of the P type band 22 of the crystal of FIGURE 6 are etched away to increase the gauge resistances.

The end portions of the crystal 20 are masked with a suitable maskant 50 impervious to the etchant to be used, the crystal beam 20 then appearing as shown in FIGURE 8. Examples of suitable maskants are polyethylene tape and certain waxes. The remaining exposed portions of the P type band 22 are then selectively etched while the resistances of each of the active gauge elements is continuously monitored. When one of the active gauge elements reaches the desired resistance value, the crystal 20 is withdrawn from the etchant bath and that particular active gauge masked and the crystal reinserted into the etchant bath until another gauge is etched to the desired resistance value. The crystal 20 is withdrawn and the second gauge is masked and the process repeated until all four of the active gauge elements are of the desired resistance. Upon completion of the etching process, the maskant is removed and the completed piezoresistive sensor then appears as shown in FIGURE 9. Assuming the etching of the active gauges has been carried on until gauge resistances of 5,000 ohms are obtained, it is seen that the remaining unetched portions of the P type band 22 adjacent the gold contacts are still of the original thickness which gave a 100 ohm gauge resistance. Hence, these remaining thicker portions are of a resistance not in excess of 100 ohms and so provide not in excess of 2% of the active gauge resistance. Therefore, even though these thicker portions are partly active because part of them will be in the strained area of the beam, the great majority of the resistance change due to physical stressing will appear in the thinner etched central portions. Hence, the active gauges are effectively defined in the upper and lower surfaces of the crystal 20.

The completed piezoresistive sensor of FIGURE 9 provides a longitudinal beam which can be loaded and supported in various ways. One particularly desirable load and support combination, as will be discussed in greater detail hereinbelow, is a point loaded freely supported beam. With this type of loading, the beam is freely supported at its ends and point loaded near its center. With this particular type of loading, a slightly different beam configuration, wherein the central loaded section of the beam is of undiminished thickness, will be desirable in certain instances. FIGURES 10 and 11 of the drawing illustrate the production of such a beam from the crystal 20 embodiment as shown in FIGURE 6. As shown in FIGURE 10, the maskant 50 is applied not only to the end portions of the crystal, but also to a central transverse band portion of the crystal 20. Then, upon completion of the etching process with the central band portion masked, the resulting piezoresistive sensor will then appear as shown in FIGURE 11, this alternative embodiment being generally indicated by the reference numeral 40.

It will be noted that in both of the embodiments shown in FIGURES 9 and 11, only six electrical leads are necessary for interconnection of the active gauges in a bridge circuit, rather than the usual eight electrical leads. However, it is possible by a different arrangement of grooves to provide the desired four-active arm bridge circuit with only five electrical leads being required. Thus, upon obtaining a crystal 20 in the configuration shown in FIGURES 1 and 2, grooves are cut in the upper and lower and end surfaces to result in the configuration shown in FIGURE 12. In this embodiment, a continuous groove 55 extends longitudinally peripherally around the crystal 20 beginning at a point 56 in the upper surface 24 spaced away from the end surface 26 and extending to and around the end surface 27, longitudinally across the lower surface 25, around the end surface 26 and over the immediate end portion of the upper surface 24 to a point 57 longitudinally spaced from the point 56 and between the point 56 and the end surface 26. A transverse groove 58 extends from the point 57 to the side surface 28, and a transverse groove 59 extends from the point 56 to the side surface 29. The grooves 55, 58 and 59 all extend through the P type surface band 22 and penetrate the underlying PN junction 23. The crystal is then provided with five gold contacts and electrical leads, the electrical leads being identified by the reference numerals 61-65. The electrical lead 61 is ohmically bonded to the upper surface 24 between the groove 58 and the edge surface 26. The electrical lead 62 is ohmically bonded to the surface 24 near the end 27 between the groove 55 and the side surface 28. The electrical lead 63 is ohmically bonded to the upper surface 24 between the groove 59 and the end surface 26. The electrical lead 64 is ohmically bonded to the upper surface 24 near the groove 59 on the other side of the groove 59 from the electrical lead 63. The electrical lead 65 is ohmically bonded to the upper surface 24 near the end 27 and between the groove 55 and the side surface 29. The crystal is then subjected to the aforementioned masking and etching steps to provide the desired active gauge resistances. Again, four active gauges are provided, with two gauges on the upper surface 24 of the crystal and two gauges on the lower surface 25 of the crystal, the active gauges being both physically and electrically connected in series between the electrical leads 64 and 61 with the gauges in proper orientation and location for a four-active arm bridge circuit. In the piezoresistive sensor embodiments shown in FIGURES 9 and 11, it was necessary to interconnect the electrical leads 45 and 47 to complete the series connection of the gauge elements. However, in the embodiment of the piezoresistive sensor shown in FIGURE 12, no interconnection of electrical leads is necessary due to interruption of the longitudinal peripheral groove 55 between the points 56 and 57. Again, all electrical contacts are made to the upper surface of the crystal beam. Other groove configurations, utilizing the present invention concepts, will become apparent to those skilled in the art and are within the scope of the invention.

In FIGURE 13 of the drawing, there is shown the electrical schematic diagram of a complete Wheatstone bridge circuit utilizing either of the six lead piezoresistive sensor embodiments of FIGURES 9 and 11. The schematic diagram of FIGURE 13 is based upon a schematic diagram of FIGURE 7, to which has been added an adjustable resistor 66, a voltmeter 67 and a voltage source 68. The adjustable resistor 66 is connected between the electrical leads 44 and 48, the adjustable resistor 66 being provided with a sliding arm 69. The voltage source 68 is connected between the sliding arm 69 of the adjustable resistor 66 and the interconnected leads 45 and 47 by respective electrical leads 71 and 72. Thus, the adjustable resistor 66 provides a zero adjustment for the bridge circuit.

In FIGURE 14 of the drawing, there is shown an elevational view depicting the use of the piezoresistive sensor 40 of FIGURE 11 as a freely supported, point loaded beam. The arrows 73 and 74 depict the points of support, while the arrow F indicates the point of application of a loading force. When loaded as shown, the active gauges on the upper side of the sensor will be subjected to compressive stresses while the gauges on the lower side of the sensor will be subjected to tensile stresses. Thus, in the schematic diagram of FIGURE 13, changes in the resistances A and C will reflect compressive stresses and changes in the resistances B and D will reflect tensile stresses. Since all four of the bridge arms are active, the bridge output voltage, as indicated by the voltmeter 67, will be approximately twice that of the usual Wheatstone bridge circuit utilizing only two active arms. And, since the stress distribution curve of a freely supported beam is of much more gradual slope than the stress distribution curve of a beam clamped at its ends the active gauge elements are practically uniformly stressed over their length at the full stress value, the effective gauge lengths being only a portion of the entire beam length. In addition, all of the advantages of using an integral semiconductor crystal body are present. The bridge circuit is relatively stable since there are no significant thermal gradients between the active gauge elements and because of the absence of hysteresis.

Referring now to FIGURES 15, 16 and 17 of the drawing, there is shown a practical application of the piezoresistive sensors of the present invention in a novel pressure transducer. The transducer is contained within a housing defined by a base support 81 having a cup-shaped cover 82 hermetically sealed thereto. The base 81 defines a cylindrical pedestal 83 extending upwardly from a supporting disc 84. A central threaded aperture 86 extends inwardly from the lower surface 87 of the disc 84 for accommodation of a threaded pressure fitting. Extending inwardly from the upper surface 88 of the pedestal 83 is an aperture 89, the aperture 89 being in concentric alignment with the threaded aperture 86 and in communication therewith (see FIGURE 16). Circumferentially spaced around the pedestal portion 83 of the base support 81 are six electrical terminal rods 91, the rods 91 extending through the disc portion 84 and insulated therefrom by glass-to-metal seals 92.

Centrally mounted to the upper surface 88 of the base support 81 is a cylindrical bellows 95. The bellows 95 is circular in shape and has corrugated upper and lower faces 96 and 97. The central portion of the lower face 97 defines a circular mounting flange 98 having a concentric hole 99 of the same diameter as the aperture 89. The bellows 95 is mounted to the base support 81 by soldering the mounting flange 98 to the upper surface 88 with the hole 99 in alignment with the aperture 89.

Mounted to the base support 81 at diametrically opposite points on the peripheral surface of the pedestal portion 83 are two flexible beam support members 101 and 102. The beam support members 101 and 102 are preferably constructed of stainless steel shim stock and are spot welded to the side surfaces of the pedestal 83 in vertical alignment. As shown in FIGURE 15, the projecting upper ends of the flexible beam supports extend above the upper surface 96 of the bellows 95 and contain transverse notches for receptive engagement of the crystal beam piezoresistive sensor, the sensor 40 being rigidly secured thereto by epoxy cement. The flexibilty of the beam support members 101 and 102 provides a satisfactory approximation of an ideal simple support in which rotation and translation are freely permitted, without allowing deflection in the support or reaction direction.

The crystal beam forming the piezoresistive sensor 40 is centrally loaded by means of a force arm 105 mounted to the upper surface 96 of the bellows 95. The force rod 105 is generally of a C-shape to thereby define a rectangular notch 106 through which the central portion of the piezoresistive sensor 40 passes. Mounted to the upper horizontal surface of the notch 106 of the force rod 105 is a jewel 107, the lowermost surface of the jewel 107 being transversely rounded (see FIGURE 16). Mounted to the lower horizontal surface of the notch 106 of the force rod 105 is a jewel 108, the uppermost surface of the jewel 108 being transversely rounded. Thin metal shims are utilzed, if necessary, between the jewels 107 and 108 and the mounting surfaces of the notch 106 to make the rounded surface of the jewels bear tightly against the piezoresistve sensor 40. Thus, expansion or contraction of the bellows 95 in response to changes in bellows pressure will cause upward or downward loading of the crystal beam piezoresistive sensor 40.

The piezoresistive sensor 40 is preloaded with a force F by means of a bias spring and adjusting screw assembly. A bias spring 111, in the form of an elongate strip of stainless steel having its ends spot-welded to the base support 81 at diametrically opposite points on the peripheral surface of the pedestal portion 83, has a weld nut 112 at its middle portion directly over the piezoresistive sensor 40. Threaded through the nut 112 and through a suitable aperture in the bias spring 111 is an adjusting screw 113, shown in detail in FIGURE 17. The lower point of the adjusting screw 113 bears against the upper surface of the force rod 105, and adjustment of the screw 113 thereby provides an amount of preloading of the crystal beam sensor 40 by the desired force F. It is desirable to preload the sensor 40 with a force F at atmospheric pressure to provide a predetermined amount of beam flexion, so that upon an increase in pressure in the bellows 95, the beam will be decreased in flexion and ultimately flexed in the other direction. This use of both positive and negative beam deflection enables a strain change of double the maximum strain magnitude, thereby resulting in the highest resistance change (and therefore output) possible for a given strain level. For the 0.01 inch thick silicon crystal utilized as the piezoresistive sensor 40, a deflection of 0.001 inch will give 7,700 p.s.i. stress in the gauge area. The strain, found by dividing the stress by Young's modulus, is $2.85 \times 10^{-6}$ strain per 0.001 inch deflection. A central beam deflection of plus or minus 0.003 inch would therefore result in a plus or minus 850 microstrain. For a typical semiconductor strain gauge factor of 120, a plus or minus 0.003 inch deflection would result in a plus or minus 10% resistance change. In practice, the hereinabove described piezoresistive sensors 40, having a length of ½ inch and a maximum thickness of 0.01 inch, have been used at a deflection of plus or minus 0.002 inch with highly satisfactory results. Accordingly, the adjusting screw 113 is adjusted to cause the crystal beam center to be deflected downwardly toward the bellows 95 by 0.002 inch.

In the construction of the illustrated pressure transducer, the bellows, the beam assembly, and the bias spring assembly are mounted to the base support 81 before mounting of the cover 82. Upon soldering of the electrical leads 44–49 of the piezoresistive sensor 40 to the appropriate electrical terminal rods 91 (only the electrical leads 48 and 49 being shown in FIGURE 16 in the interest of clarity), the adjusting screw 113 is adjusted to provide the desired 0.002 inch deflection of the crystal beam. The cover 82 is then mounted and hermetically sealed to the base support 81 by soldering. An access hole 109 is provided in the upper surface of the cover 82 to permit the interior of the transducer to be evacuated of all gases, the access hole 109 then being sealed with solder.

After sealing, atmospheric pressure introduced into the interior of the bellows 95 through the threaded aperture 86 and the hole 89 will cause the bellows to tend to expand. The effective area of the bellows and the system stiffness is such that 0.004 inch of relative movement of the bellows surface 96 and 97 is typical. The crystal beam sensor 40 is then deflected 0.002 inch overcenter in the direction opposite to that caused by the bias spring adjustment (i.e., the beam is deflected upwards). If the absolute pressure introduced into the threaded aperture 86 is gradually reduced from one atmosphere down to zero, the bias spring, crystal beam sensor, and bellows system will in unison retravel the 0.004 inch to the initial preloaded position. At any point in between, there will be an equilibrium between the force exerted by the "spring" system and the summed force due to the pressure difference between the bellows interior and exterior over the bellows effective area. Simultaneous with the bellows movement is a linear change in strain in the gauge area of the crystal beam sensor. The strain change causes an electrical resistance change of about plus or minus 7% in the gauges. The electrical circuit shown in FIGURE 13 is utilized to detect this resistance change as a bridge unbalance voltage.

Upon remembering that the length of the crystal beam sensor 40 is only ½ inch, it is readily apparent that the illustrated pressure transducer can be very compact, a volume of less than ½ cubic inch and a weight of less than 1 ounce being easily obtainable. Utilizing a 15 p.s.i.a. range, it is easily possible to obtain 0–2 volts output with 20 volts input without the use of auxiliary amplifiers, as compared with a typical full range output of 0.04 volt with a 10 volt input for a wire strain gauge barometer. When utilizing the illustrated pressure transducer as a microbarometer (15 p.s.i.a.), the relative stiffnesses or spring rates of the bellows 95, the crystal beam sensor 40, and bias spring 111 are respectively 1, 0.7 and 3.3 units, where 1 unit is equivalent to a pressure of 81 pounds per inch. The total or system spring rate in the operating direction is 5 units, or 5 times the bellows stiffness. Neither the system spring rate nor its linearity are appreciably altered by the bias-spring action or its adjustment. The most highly stressed member of the system is the crystal beam sensor 40. Single crystal silicon is hysteresis free, and the system hysteresis is minimized by keeping the operating stresses low in the bellows and in the bias spring. The perpendicular alignment of the bias spring with the crystal beam sensor provides lateral support in the cross-axis direction (transverse to the operating axis), so that the system is relatively immune to vibration. In addition, due to the small physical size of the barometer, the lowest resonant frequency along any axis is in excess of 2,000 cycles per second, a resonant frequency considerably higher than that of most barometers. Therefore, the illustrated pressure transducer is rugged as well as compact and sensitive.

Thus, there has been described hereinabove novel piezoresistive sensors of integral crystal construction, together with a novel practical embodiment of their use in a pressure transducer. The illustrated embodiments of the piezoresistive sensors provided four active gauge elements properly oriented and interconnected for use in a four arm bridge circuit. It is readily apparent, however, that the present invention structural concepts can be utilized to provide single crystal piezoresistive sensors having a different number of active gauges. For example, merely by cutting in half the sensors illustrated in FIGURES 9 and 11 of the drawing along the longitudinal groove 31, a pair of two-gauge sensors would result, the two arm circuitry requiring only three electrical leads instead of four.

Also, different construction techniques may be followed in the fabrication of the present invention piezoresistive sensors. For example, fabrication might be simplified by constructing the piezoresistive sensor in the form of upper and lower beam halves and cementing the halves together along the neutral axis of the resultant sensor beam. Such a procedure would simplify the formation of the various grooves and attachment of the electrical contacts and leads. Of course, although a feature of the illustrated embodiments provided all of the electrical contacts on one beam surface, some of the contacts could be provided on the opposing beam surface where the active gauges are positioned. Furthermore, the concept of a four active arm gauge system is also applicable to conventionally bonded semiconductor strain gauges, each active gauge element being mechanically bonded to the proper surface of a beam. Thus, although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:
1. A semiconductor strain gauge comprising:
 (a) an elongate single semiconductor crystal of predetermined crystallographic orientation and of a first predetermined conductivity type, said semiconductor crystal defining first and second opposed longitudinal surfaces, said first and second longitudinal surfaces and the end surfaces of said crystal containing therein active impurity atoms of a second predetermined conductivity type to thereby define a shallow peripheral surface band of said second predetermined conductivity type longitudinally encircling said crystal exclusive of its longitudinal edge surface, said peripheral surface band of said second predetermined conductivity type being electrically isolated from the remaining first conductivity type portion of said crystal by the high impedance barrier provided by the junction therebetween, said crystal having a plurality of predetermined grooves in the longitudinal and end surfaces thereof extending inwardly through said surface and penetrating the underlying junction, said grooves dividing said band into discrete electrically isolated surface regions of said second predetermined conductivity type; and
 (b) a plurality of electrical contacts ohmically bonded to predetermined points on a longitudinal surface of said body for connection of electrical measuring circuitry thereto for measurement of changes in the electrical resistance of said discrete surface regions between said contacts upon stressing of said crystal.
2. A semiconductor strain gauge comprising:
 (a) an elongate single semiconductor crystal of P type silicon of [100] crystallographic orientation, said semiconductor crystal defining first and second opposed longitudinal surfaces, said first and second longitudinal surfaces and the end surfaces of said silicon crystal containing therein active impurity atoms of N type conductivity to thereby define a shallow peripheral surface band of N type conductivity longitudinally encircling said crystal exclusive of its longitudinal side surfaces, said N type surface band being electrically isolated from the remaining P type portion of said crystal body by the high impedance barrier provided by the PN junction therebetween, said crystal having a plurality of predetermined grooves in the longitudinal and end surfaces thereof extending inwardly through said N type band and penetrating the underlying PN junction, said grooves dividing said N type band into discrete electrically isolated N type surface regions; and (b) a plurality of electrical contacts ohmically bonded to predetermined points on a longitudinal surface of said body for connection of electrical measuring circuitry thereto for measurement of changes in the electrical resistance of said discrete N type surface regions between said contacts upon stressing of said crystal.

3. A semiconductor strain gauge comprising:

(a) an elongate single semiconductor crystal of N type conductivity of [111] crystallographic orientation, said silicon crystal defining first and second opposed longitudinal surfaces, said first and second longitudinal surfaces and the end surfaces of said silicon crystal containing therein active impurity atoms of P type conductivity to thereby define a shallow peripheral surface band of P type conductivity encircling said crystal exclusive of its longitudinal side surfaces, said P type surface band being electrically isolated from the remaining N type portion of said silicon crystal by the high impedance barrier provided by the PN junction therebetween, said crystal having a plurality of predetermined grooves in the longitudinal and end surfaces thereof extending inwardly through said P type surface band and penetrating the underlying PN junction, said grooves dividing said P type band into discrete electrically isolated P type surface regions; and (b) a plurality of electrical contacts ohmically bonded to predetermined points on a longitudinal surface of said body for connection of electrical measuring circuitry thereto for measurement of changes in the electrical resistance of said discrete P type surface regions between said contacts upon stressing of said crystal.

4. A semiconductor strain gauge comprising:

(a) an elongated single semiconductor crystal of predetermined crystallographic orientation and of a first predetermined conductivity type, said semiconductor crystal defining first and second opposed longitudinal surfaces, said first and second longitudinal surfaces and the end surfaces of said crystal having diffused therein active impurity atoms of a second predetermined conductivity type to thereby define a shallow peripheral surface band of said second predetermined conductivity type longitudinally encircling said crystal exclusive of its longitudinal side surfaces, said peripheral surface band of said second conductivity type being electrically isolated from the remaining first conductivity portion of said crystal by the high impedance barrier provided by the junction therebetween, said crystal having a transverse groove near one end thereof extending across said first longitudinal surface, said groove extending inwardly into said crystal from said first longitudinal surface through said peripheral surface band and penetrating the underlying junction;

(b) a first electrical contact ohmically bonded to said first longitudinal surface of said crystal at said one end thereof adjacent said groove;

(c) a second electrical contact ohmically bonded to said first longitudinal surface of said crystal adjacent said groove on the opposite side of said groove from said first electrical contact; and (d) a third electrical contact ohmically bonded to said first longitudinal surface of said crystal body near the other end thereof.

5. A semiconductor strain gauge comprising:

(a) an elongate single semiconductor crystal of P type silicon having a [100] crystallographic orientation, said silicon crystal defining first and second opposed longitudinal surfaces, said first and second longitudinal surfaces and the end surfaces of said crystal having diffused therein active impurity atoms of N type conductivity to thereby define a shallow peripheral surface band of N type conductivity longitudinally encircling said crystal exclusive of its longitudinal side surfaces, said peripheral N type surface band being electrically isolated from the remaining P type portion of said crystal by the high impedance barrier provided by the PN junction therebetween, said crystal having a transverse groove near one end thereof extending across said first longitudinal surface, said groove extending inwardly into said crystal from said first longitudinal surface through said N type surface band and penetrating the underlying PN junction;

(b) a first electrical contact ohmically bonded to said first longitudinal surface of said crystal at said one end thereof adjacent said groove;

(c) a second electrical contact ohmically bonded to said first longitudinal surface of said crystal adjacent said groove on the opposite side of said groove from said first electrical contact; and (d) a third electrical contact ohmically bonded to said first longitudinal surface of said crystal body near the other end thereof.

6. A semiconductor strain gauge comprising:

(a) an elongate single semiconductor crystal of N type silicon having a [111] crystallographic orientation said silicon crystal defining first and second opposed longitudinal surfaces, said first and second longitudinal surfaces and the end surfaces of said crystal having diffused therein active impurity atoms of P type conductivity to thereby define a shallow peripheral surface band of P type conductivity longitudinally encircling said crystal exclusive of its longitudinal side surfaces, said peripheral surface band of P type conductivity being electrically isolated from the remaining N type portion of said crystal by the high impedance barrier provided by the PN junction therebetween, said crystal having a transverse groove near one end thereof extending across said first longitudinal surface, said groove extending inwardly into said crystal from said first longitudinal surface through said P type surface band and penetrating the underlying PN junction;

(b) a first electrical contact ohmically bonded to said first longitudinal surface of said crystal at said one end thereof adjacent said groove;

(c) a second electrical contact ohmically bonded to said first longitudinal surface of said crystal adjacent said groove on the opposite side of said groove from said first electrical contact; and (d) a third electrical contact ohmically bonded to said first longitudinal surface of said crystal body near the other end thereof.

7. A semiconductor strain gauge comprising:

(a) an elongate single semiconductor crystal of predetermined crystallographic orientation and of a first predetermined conductivity type, said semiconductor crystal defining first and second opposed longitudinal surfaces, said first and second longitudinal surfaces and the end surfaces of said crystal having diffused therein active impurity atoms of a second predetermined conductivity type to thereby define a shallow peripheral surface band of said second predetermined conductivity type longitudinally encircling said crystal exclusive of its longitudinal side surfaces, said peripheral surface band of said second conductivity type being electrically isolated from the remaining first conductivity portion of said crystal by the high impedance barrier provided by the junction therebetween, said crystal having first and second and third grooves therein, said first groove extending longitudinally peripherally around said crystal through the longitudinal surfaces and end surfaces thereof, said second groove being in said first longitudinal surface near one end of said crystal and extending transversely from said first groove to one longitudinal side surface of said crystal, said third groove being in said first longitudinal surface near said one end of said crystal and extending transversely from said first groove to the other longitudinal side surface of said crystal, said grooves extending inwardly into said crystal through said peripheral surface band and penetrating the underlying junction;

(b) a first electrical contact ohmically bonded to said first longitudinal surface of said crystal at said one end thereof adjacent said second groove;

(c) a second electrical contact ohmically bonded to said first longitudinal surface of said crystal body adjacent said second groove on the opposite side of said second groove from said first electrical contact;

(d) a third electrical contact ohmically bonded to said first longitudinal surface of said crystal body near the other end thereof on one side of said first groove;

(e) a fourth electrical contact ohmically bonded to said first longitudinal surface of said crystal at said one end thereof adjacent said third groove;

(f) a fifth electrical contact ohmically bonded to said first longitudinal surface of said crystal adjacent said third groove on the opposite side of said third groove from said fourth electrical contact; and (g) a sixth electrical contact ohmically bonded to said first longitudinal surface of said crystal body near the other end thereof on the other side of said first groove.

8. A semiconductor strain gauge comprising:

(a) an elongate single semiconductor crystal of P type silicon having a [100] crystallographic orientation, said silicon crystal defining first and second opposed longitudinal surfaces, said first and second longitudinal surfaces and the end surfaces of said crystal having diffused therein active impurity atoms of N type conductivity to thereby define a shallow peripheral surface band of N type conductivity longitudinally encircling said crystal exclusive of its longitudinal side surfaces, said peripheral surface band of N type conductivity being electrically isolated from the remaining P type portion of said crystal by the high impedance barrier provided by the PN junction therebetween, said crystal having first and second and third grooves therein, said first groove extending longitudinally peripherally around said crystal through the longitudinal surfaces and end surfaces thereof, said second groove being in said first longitudinal surface near one end of said crystal and extending transversely from said first groove to one longitudinal side surface of said crystal, said third groove being in said first longitudinal surface near said one end of said crystal and extending transversely from said first groove to the other longitudinal side surface of said crystal, said grooves extending inwardly into said crystal through said N type surface band and penetrating the underlying PN junction;

(b) a first electrical contact ohmically bonded to said first longitudinal surface of said crystal at said one end thereof adjacent said second groove;

(c) a second electrical contact ohmically bonded to said first longitudinal surface of said crystal body adjacent said second groove on the opposite side of said second groove from said first electrical contact;

(d) a third electrical contact ohmically bonded to said first longitudinal surface of said crystal body near the other end thereof on one side of said first groove;

(e) a fourth electrical contact ohmically bonded to said first longitudinal surface of said crystal at said one end thereof adjacent said third groove;

(f) a fifth electrical contact ohmically bonded to said first longitudinal surface of said crystal adjacent said third groove on the opposite side of said third groove from said fourth electrical contact; and, (g) a sixth electrical contact ohmically bonded to said first longitudinal surface of said crystal body near the other end thereof on the other side of said first groove.

9. A semiconductor strain gauge comprising:

(a) an elongate single semiconductor crystal of N type silicon having a [111] crystallographic orientation, said silicon crystal defining first and second opposed longitudinal surfaces, said first and second longitudinal surfaces and the end surfaces of said crystal having diffused therein active impurity atoms of P type conductivity to thereby define a shallow peripheral surface band of P type conductivity longitudinally encircling said crystal exclusive of its longitudinal side surfaces, said peripheral surface band of P type conductivity being electrically isolated from the remaining N type portion of said crystal by the high impedance barrier provided by the PN junction therebetween, said crystal having first and second and third grooves therein, said first groove extending longitudinally peripherally around said crystal through the longitudinal surfaces and end surfaces thereof, said second groove being in said first longitudinal surface near one end of said crystal and extending transversely from said first groove to one longitudinal side surface of said crystal, said third groove being in said first longitudinal surface near said one end of said crystal and extending transversely from said first groove to the other longitudinal side surface of said crystal, said grooves extending inwardly into said crystal through said P type surface band and penetrating the underlying PN junction;

(b) a first electrical contact ohmically bonded to said first longitudinal surface of said crystal at said one end thereof adjacent said second groove;

(c) a second electrical contact ohmically bonded to said first longitudinal surface of said crystal body adjacent said second groove on the opposite side of said second groove from said first electrical contact;

(d) a third electrical contact ohmically bonded to said first longitudinal surface of said crystal body near the other end thereof on one side of said first groove;

(e) a fourth electrical contact ohmically bonded to said first longitudinal surface of said crystal at said one end thereof adjacent said third groove;

(f) a fifth electrical contact ohmically bonded to said first longitudinal surface of said crystal adjacent said third groove on the opposite side of said third groove from said fourth electrical contact; and (g) a sixth electrical contact ohmically bonded to said first longitudinal surface of said crystal body near the other end thereof on the other side of said first groove.

10. A semiconductor strain gauge comprising:

(a) an elongate single semiconductor crystal of predetermined crystallographic orientation and of a first predetermined conductivity type, said semiconductor crystal defining first and second opposed longitudinal surfaces, said first and second longitudinal surfaces and the end surfaces of said crystal having diffused therein active impurity atoms of a second predetermined conductivity type to thereby define a shallow peripheral surface band of said second predetermined conductivity type longitudinally encircling said crystal exclusive of its longitudinal side surfaces, said peripheral surface band of said second conductivity type being electrically isolated from the remaining first conductivity portion of said crystal by the high impedance barrier provided by the junction therebetween, said crystal having first and second and third linear grooves therein, said first linear groove beginning at a first predetermined point on said first longitudinal surface near one end of said crystal and extending longitudinally peripherally around said crystal along said surface band to a second predetermined point spaced apart from said first predetermined point in said first longitudinal surface, said second groove being in said first longitudinal surface and extending transversely from the end of said first groove at said first predetermined point to one longitudinal side surface of said crystal, said third groove being in said first longitudinal surface and extending transversely from the other end of said first groove at said second predetermined point to the other longitudinal side surface of said crystal, said grooves extending inwardly into said crystal through said surface band and penetrating the underlying junction;

(b) a first electrical contact ohmically bonded to said first longitudinal surface of said crystal near said one longitudinal side surface thereof between said second groove and said one end thereof;

(c) a second electrical contact ohmically bonded to said first longitudinal surface of said crystal near said one longitudinal side surface thereof proximate the other end thereof;

(d) a third electrical contact ohmically bonded to said first longitudinal surface of said crystal near said other longitudinal side surface thereof between said third groove and said one end thereof;

(e) a fourth electrical contact ohmically bonded to said first longitudinal surface of said crystal near said other longitudinal side surface thereof adjacent said third groove on the opposite side of said third groove from said third electrical contact; and (f) a fifth electrical contact ohmically bonded to said first longitudinal surface of said crystal near said other longitudinal side surface thereof adjacent said other end thereof.

11. A semiconductor strain gauge comprising:

(a) an elongate single semiconductor crystal of P-type silicon having a [100] crystallographic orientation, said silicon crystal defining first and second opposed longitudinal surfaces, said first and second longitudinal surfaces and the end surfaces of said crystal having diffused therein active impurity atoms of N-type conductivity to thereby define a shallow peripheral surface band of N type conductivity longitudinally encircling said crystal exclusive of its longitudinal side surfaces, said peripheral surface band of N type conductivity being electrically isolated from the remaining P type portion of said crystal by the high impedance barrier provided by the PN junction therebetween, said crystal having first and second and third linear grooves therein, said first linear groove beginning at a first predetermined point on said first longitudinal surface near one end of said crystal and extending longitudinally peripherally around said crystal along said N type surface band to a second predetermined point spaced apart from said first predetermined point in said first longitudinal surface, said second groove being in said first longitudinal surface and extending transversely from the end of said first groove at said predetermined point to one longitudinal side surface of said crystal, said third groove being in said first longitudinal surface and extending transversely from the other end of said first groove at said second predetermined point to the other longitudinal side surface of said crystal, said grooves extending inwardly into said crystal through said N type surface band and penetrating the underlying PN junction;

(b) a first electrical contact ohmically bonded to said first longitudinal surface of said crystal near said one longitudinal side surface thereof between said second groove and said one end thereof;

(c) a second electrical contact ohmically bonded to said first longitudinal surface of said crystal near said one longitudinal side surface thereof proximate the other end thereof;

(d) a third electrical contact ohmically bonded to said first longitudinal surface of said crystal near said other longitudinal side surface thereof between said third groove and said one end thereof;

(e) a fourth electrical contact ohmically bonded to said first longitudinal surface of said crystal near said other longitudinal side surface thereof adjacent said third groove on the opposite side of said third groove from said third electrical contact; and, (f) a fifth electrical contact ohmically bonded to said first longitudinal surface of said crystal near said other longitudinal side surface thereof adjacent said other end thereof.

12. A semiconductor strain gauge comprising:

(a) an elongate single semiconductor crystal of N type silicon of [111] crystallographic orientation, said silicon crystal defining first and second opposed longitudinal surfaces, said first and second longitudinal surfaces and the end surfaces of said crystal having diffused therein active impurity atoms of P type conductivity to thereby define a shallow peripheral surface band of P type conductivity longitudinally encircling said crystal exclusive of its longitudinal side surfaces, said peripheral surface band of P type conductivity being electrically isolated from the remaining N type portion of said crystal by the high impedance barrier provided by the PN junction therebetween, said crystal having first and second and third linear grooves therein, said first linear groove beginning at a first predetermined point on said first longitudinal surface near one end of said crystal and extending longitudinally peripherally around said crystal along said P type surface band to a second predetermined point spaced apart from said first predetermined point in said first longitudinal surface, said second groove being in said first longitudinal surface and extending transversely from the end of said first groove at said first predetermined point to one longitudinal side surface of said crystal, said third groove being in said first longitudinal surface and extending transversely from the other end of said first groove at said second predetermined point to the other longitudinal side surface of said crystal, said grooves extending inwardly into said crystal through said P type surface band and penetrating the underlying PN junction;

(b) a first electrical contact ohmically bonded to said first longitudinal surface of said crystal near said one longitudinal side surface thereof between said second groove and said one end thereof;

(c) a second electrical contact ohmically bonded to said first longitudinal surface of said crystal near said one longitudinal side surface thereof proximate the other end thereof;

(d) a third electrical contact ohmically bonded to said first longitudinal surface of said crystal near said other longitudinal side surface thereof between said third groove and said one end thereof;

(e) a fourth electrical contact ohmically bonded to said first longitudinal surface of said crystal near said other longitudinal side surface thereof adjacent said third groove on the opposite side of said third groove from said third electrical contact; and (f) a fifth eelctrical contact ohmically bonded to said first longitudinal surface of said crystal near said other longitudinal side surface thereof adjacent said other end thereof.

13. A transducer structure comprising, in combination:

(a) an elongate semiconductor beam freely supported at its ends, said beam consisting of an elongate single semiconductor crystal of predetermined crystallographic orientation and of a first predetermined conductivity type, said semiconductor crystal defining first and second opposed longitudinal surfaces, said first longitudinal surface having diffused therein discrete shallow regions of a second predetermined conductivity type electrically isolated from each other, said diffused regions longitudinally extending lengthwise of said semiconductor crystal, said diffused regions being electrically isolated from said first predetermined conductivity type portion of said crystal by the high impedance junctions therebetween;

(b) a plurality of electrical contacts ohmically bonded to said diffused regions near longitudinal ends thereof to provide each of said diffused regions with an electrical contact near each of its ends; and (c) force-summing means contacting said beam intermediate its ends and movable transversely thereto in response to predetermined forces whereby application of said predetermined forces to said force-summing means causes movement of said force-summing means transversely to said beam to thereby apply a tensile stress to said beam and cause a variation in the electrical resistance of each of said diffused regions, which resistance variations can be measured by electrically interconnecting said electrical contacts so that each of said diffused regions forms a different leg in a Wheatstone bridge circuit.

14. A transducer structure comprising, in combination:

(a) an elongate beam freely supported at its ends, said beam consisting of an elongate single semiconductor crystal of predetermined crystallographic orientation and of a first predetermined conductivity type, said semiconductor crystal defining first and second opposed longitudinal surfaces, said first and second longitudinal surfaces and the end surfaces of said crystal having diffused therein active impurity atoms of a second predetermined conductivity type to thereby define a shallow peripheral surface band of said second predetermined conductivity type longitudinally encircling said crystal exclusive of its longitudinal side surfaces, said peripheral surface band of said second conductivity type being electrically isolated from the remaining first conductivity type portion of said crystal by the high impedance barrier provided by the junction therebetween, said crystal having a transverse groove near one end thereof extending across said first longitudinal surface, said groove extending inwardly into said crystal from said first longitudinal surface through said surface band and penetrating the underlying junction;

(b) a first electrical contact ohmically bonded to said first longitudinal surface of said crystal at said one end thereof adjacent said groove;

(c) a second electrical contact ohmically bonded to said first longitudinal surface of said crystal adjacent said groove on the opposite side of said groove from said first electrical contact;

(d) a third electrical contact ohmically bonded to said first longitudinal surface of said crystal body near the other end thereof; and (e) force-summing means contacting the first longitudinal surface of said crystal beam intermediate its ends and movable transversely thereto in response to predetermined forces whereby application of said predetermined forces to said force-summing means causes movement of said force-summing means transversely to said beam to thereby apply a tensile stress to said beam and cause variation in the electrical resistance of said peripheral surface band between said electrical contacts.

15. A transducer structure comprising, in combination:

(a) an elongate beam freely supported at its ends, said beam consisting of an elongate single semiconductor crystal of predetermined crystallographic orientation and of a first predetermined conductivity type, said semiconductor crystal defining first and second opposed longitudinal surfaces, said first and second longitudinal surfaces and the end surfaces of said crystal having diffused therein active impurity atoms of a second predetermined conductivity type longitudinally encircling said crystal exclusive of its longitudinal side surfaces, said peripheral surface band of said second conductivity type being electrically isolated from the remaining first conductivity type portion of said crystal by the high impedance barrier provided by the junction therebetween, said first longitudinal surface having first and second and third grooves therein, said first groove extending longitudinally peripherally around said crystal beam through the longitudinal surfaces and end surface thereof, said second groove being in said first longitudinal surface near one end of said crystal and extending transversely from said first groove to one longitudinal side surface of said crystal, said third groove being in said first longitudinal surface near said one end of said crystal and extending transversely from said first groove to the other longitudinal side surface of said crystal, said grooves extending inwardly into said crystal through said surface band and penetrating the underlying junction;

(b) a first electrical contact ohmically bonded to said first longitudinal surface of said crystal at said one end thereof adjacent said second groove;

(c) a second electrical contact ohmically bonded to said first longitudinal surface of said crystal body adjacent said second groove on the opposite side of said second groove from said first electrical contact;

(d) a third electrical contact ohmically bonded to said first longitudinal surface of said crystal body near the other end thereof on one side of said first groove;

(e) a fourth electrical contact ohmically bonded to said first longitudinal surface of said crystal at said one end thereof adjacent said third groove;

(f) a fifth electrical contact ohmically bonded to said first longitudinal surface of said crystal adjacent said third groove on the opposite side of said third groove from said fourth electrical contact;

(g) a sixth electrical contact ohmically bonded to said first longitudinal surface of said crystal body near the other end thereof on the other side of said first groove; and (h) force-summing means contacting the first longitudinal surface of said crystal beam intermediate its ends and movable transversely thereto in response to predetermined forces whereby application of said predetermined forces to said force-summing means causes movement of said force-summing means transversely to said beam to thereby apply a tensile stress to said beam and cause variation in the electrical resistance of said peripheral surface band between said electrical contacts.

16. A transducer structure comprising, in combination:

(a) an elongate beam freely supported at its ends, said beam consisting of an elongate single semiconductor crystal of predetermined crystallographic orientation and of a first predetermined conductivity type, said semiconductor crystal defining first and second opposed longitudinal surfaces, said first and second longitudinal surfaces and the end surfaces of said crystal having diffused therein active impurity atoms of a second predetermined conductivity type to thereby define a shallow peripheral surface band of said second predetermined conductivity type longitudinally encircling said crystal exclusive of its longitudinal side surfaces, said peripheral surface band of said second conductivity type being electrically isolated from the remaining first conductivity type portion of said crystal by the high impedance barrier by the junction therebetween, said crystal having first and second and third linear grooves therein, said first linear groove beginning at a first predetermined point on said first longitudinal surface near one end of said crystal and extending longitudinally peripherally around said crystal along said surface band to a second predetermined point spaced apart from said first predetermined point in said first longitudinal surface and extending transversely from the end of said first groove at said first predetermined point to one longitudinal side surface of said crystal, said third groove being in said first longitudinal surface and extending transversely from the other end of said first groove at said second predetermined point to the other longitudinal side surface of said crystal, said grooves extending inwardly into said crystal through said surface band and penetrating the underlying junction;

(b) a first electrical contact ohmically bonded to said first longitudinal surface of said crystal near said one longitudinal side surface thereof between said second groove and said one end thereof;

(c) a second electrical contact ohmically bonded to said first longitudinal surface of said crystal near said one longitudinal side surface thereof proximate the other end thereof;

(d) a third electrical contact ohmically bonded to said first longitudinal surface of said crystal near said other longitudinal side surface thereof between said third groove and said one end thereof;

(e) a fourth electrical contact ohmically bonded to said first longitudinal surface of said crystal near said other longitudinal side surface thereof adjacent said third groove on the opposite side of said third groove from said third electrical contact;

(f) a fifth electrical contact ohmically bonded to said first longitudinal surface of said crystal near said other longitudinal side surface thereof adjacent said other end thereof; and (g) force-summing means contacting the first longitudinal surface of said crystal beam intermediate its ends and movable transversely thereto in response to predetermined forces whereby application of said predetermined forces to said force-summing means causes movement of said force-summing means transversely to said beam and to thereby apply a tensile stress to said beam and cause variation in the electrical resistance of said peripheral surface band between said electrical contacts.

17. A pressure transducer comprising in combination:
(a) a transducer housing consisting of a base member having a generally cup-shaped cover hermetically sealed thereto, said base member defining a pressure port extending therethrough communicating with the interior of said housing;

(b) a bellows defining an expansible air chamber terminating in an air inlet port, said bellows being hermetically sealed to said base member peripherally encircling said pressure port within said housing with said air inlet port communicating with said pressure port;

(c) an elongate rigid bar mounted by one of its ends for longitudinal linear movement upon expansion and contraction of said bellows, said bar defining a transverse generally rectangular notch near its other end;

(d) a piezoresistive sensor in the form of an elongate beam supported at its end within said housing with the central portion of said beam within said transverse notch in said bar; and (e) spring biasing means mounted within said housing, said spring biasing means being selectively adjustable to provide a predetermined force upon said other end of said rod.

18. A pressure transducer as defined in claim 17 wherein said beam consists of an elongate single semi-conductor crystal of predetermined crystallographic orientation and of a first predetermined conductivity type, said semiconductor crystal defining first and second opposed longitudinal surfaces, said first and second longitudinal surfaces and the end surfaces of said crystal containing therein active impurity atoms of a second predetermined conductivity type to thereby define a shallow peripheral band of said second predetermined conductivity type longitudinally encircling said crystal exclusive of its longitudinal side surfaces, said surface band of said second predetermined conductivity type being electrically isolated from the remaining first conductivity type portion of said crystal by the high impedance barrier provided by the junction therebetween, said crystal having a plurality of predetermined grooves in the longitudinal and end surfaces thereof extending inwardly through said band and penetrating the underlying junction, said grooves dividing said band into discrete electrically isolated surface regions of said second predetermined conductivity type, said crystal having a plurality of electrical connectors ohmically bonded to predetermined points on a longitudinal surface of said crystal for connection of electrical measuring circuitry thereto for measurement of changes in the electrical resistance of said discrete surface regions between said contacts upon stressing of said crystal beam by said rod upon movement of said bellows.

19. A pressure transducer as defined in claim 17 wherein said beam consists of an elongate single semiconductor crystal of predetermined crystallographic orientation and of a first predetermined conductivity type, said semiconductor crystal defining first and second opposed longitudinal surfaces, said first and second longitudinal surfaces and the end surfaces of said crystal having diffused therein activity impurity atoms of a second predetermined conductivity type to thereby define a shallow peripheral surface band of said second predetermined conductivity type longitudinally encircling said crystal exclusive of its longitudinal side surfaces, said peripheral surface band of said second conductivity type being electrically isolated from the remaining first conductivity type portion of said crystal by the high impedance barrier provided by the junction therebetween, said crystal having first and second and third grooves therein, said first groove extending longitudinally peripherally around said crystal through the longitudinal surfaces and end surfaces thereof, said second groove being in said first longitudinal surface near one end of said crystal and extending transversely from said first groove to one longitudinal side surface of said crystal, said third groove being in said first longitudinal surface near said one of said crystal and extending transversely from said first groove to the other longitudinal side surface of said crystal, said crystal having six electrical contacts ohmically bonded to said first longitudinal surface thereof, the first electrical contact being bonded to said first longitudinal surface near said one end of said crystal adjacent said second groove, the second electrical contact being bonded to said first longitudinal surface near said one end of said crystal on the other side of said second groove from said first electrical contact, the third electrical contact being bonded to said first longitudinal surface adjacent the other end of said crystal near said one longitudinal side surface thereof, the fourth electrical contact being bonded to said first longitudinal surface near said one end of said crystal adjacent said third groove, the fifth electrical contact being bonded to said first longitudinal surface near said one end on the other side of said third groove from said fourth electrical contact, said sixth electrical contact being bonded to said first longitudinal surface adjacent said other end of said crystal near said other longitudinal side surface thereof.

20. A pressure transducer as defined in claim 17, wherein said beam consists of an elongate single semiconductor crystal of predetermined crystallographic orientation and of a first predetermined conductivity type, said semiconductor crystal defining first and second opposed longitudinal surfaces, said first and second longitudinal surfaces and the end surfaces of said crystal having diffused therein active impurity atoms of a second predetermined conductivity type to thereby define a shallow peripheral surface band of said second predetermined conductivity type longitudinally encircling said crystal exclusive of its longitudinal side surfaces, said peripheral surface band of said second conductivity type being electrically isolated from the remaining first conductivity type portion of said crystal by the high impedance barrier provided by the junction therebetween, said crystal having first and second and third linear grooves therein, said first linear groove beginning at a first predetermined point on said first longitudinal surface near one end of said crystal and extending longitudinally peripherally around said crystal along said surface band to a second predetermined point spaced apart from said first predetermined point in said first longitudinal surface, said second groove being in said first longitudinal surface and extending transversely from the end of said first groove at said first predetermined point to one longitudinal side surface of said crystal, said third groove being in said first longitudinal surface and extending transversely from the other end of said first groove at said second predetermined point to the other longitudinal side surface of said crystal, said crystal having five electrical contacts ohmically bonded to the first longitudinal surface thereof, the first electrical contact being bonded to said first longitudinal surface between said second groove and said one end of said crystal, the second electrical contact being bonded to said first longitudinal surface adjacent the other end of said crystal near said one longitudinal side surface thereof, the third electrical contact being bonded to said first longitudinal surface between said third groove and said one end of said crystal, the fourth electrical contact being bonded to said first longitudinal surface adjacent said third groove on the other side of said third groove from said third electrical contact, the fifth electrical contact being bonded to said first longitudinal surface adjacent said other end of said crystal near said other side surface of said crystal.

21. A semiconductor strain gauge comprising:
(a) an elongate single semiconductor crystal of predetermined crystallographic orientation and of a first predetermined conductivity type, said semiconductor crystal defining first and second opposed longitudinal surfaces, said first and second longitudinal surfaces and the end surfaces of said crystal containing therein active impurity atoms of a second predetermined conductivity type to thereby define a shallow peripheral surface band of said second predetermined conductivity type encircling said crystal exclusive of its longitudinal side surfaces, said peripheral surface band of said second predetermined conductivity type being electrically isolated from the remaining first conductivity type portion of said crystal by the high impedance barrier provided by the junction therebetween, said crystal having a groove extending transversely across said peripheral surface band and penetrating through said junction to thereby interrupt the continuity of said peripheral surface band;
(b) a first electrical contact ohmically bonded to said to said first longitudinal surface of said crystal within said peripheral surface band and adjacent said groove; and,
(c) A second electrical contact ohmically bonded to said first longitudinal surface of said crystal within said peripheral surface band and adjacent said groove on the opposite side of said groove from said first electrical contact.

References Cited in the file of this patent
UNITED STATES PATENTS

| 2,738,259 | Ellis | Mar. 13, 1956 |
| 2,827,367 | Cox | Mar. 18, 1958 |
| 3,008,109 | Starr | Nov. 7, 1961 |
| 3,049,685 | Wright | Aug. 14, 1962 |
| 3,060,395 | Sandven | Oct. 23, 1962 |
| 3,084,300 | Sanchez | Apr. 2, 1963 |
| 3,089,108 | Gong et al. | May 7, 1963 |

OTHER REFERENCES

Forst: "Applications of Semiconductor Transducers in Strain Gages and Rigid Dynamometers," S.E.S.A. Proceedings, vol. XVII, No. 1, March 1959, pages 142–8.

RICHARD M. WOOD, *Primary Examiner.*